(12) United States Patent
Chen (10) Patent No.: US 9,028,061 B2
(45) Date of Patent: May 12, 2015

(54) ADJUSTABLE NOSE PAD STRUCTURE

(71) Applicant: Aswan International Corp., Taipei (TW)

(72) Inventor: Chiang-Mao Chen, Taipei (TW)

(73) Assignee: Aswan International Corp., Taipei (TW)

( * ) Notice: Subject to any disclaimer, the term of this patent is extended or adjusted under 35 U.S.C. 154(b) by 73 days.

(21) Appl. No.: 13/969,967

(22) Filed: Aug. 19, 2013

(65) Prior Publication Data

US 2015/0049298 A1 Feb. 19, 2015

(51) Int. Cl.
*G02C 5/12* (2006.01)

(52) U.S. Cl.
CPC ..................................... *G02C 5/122* (2013.01)

(58) Field of Classification Search
CPC .......... G02C 5/12; G02C 5/122; G02C 5/126; G02C 5/128
USPC ...................... 351/78–81, 136–139
See application file for complete search history.

(56) References Cited

U.S. PATENT DOCUMENTS

2010/0225879 A1* 9/2010 Pulito ........................... 351/137

* cited by examiner

*Primary Examiner* — Huy K Mai
(74) *Attorney, Agent, or Firm* — Li&Cai Intellectual Property (USA) Office (57) ABSTRACT

An adjustable nose pad structure comprises a main body and two adjustable members. The main body includes two adjustable portions having portions defining an open slot and a groove. The open slot has two opposite sidewalls, and a plurality of first recesses and second recesses. Each adjustable member is disposed in each adjustable portion. Each adjustable portion includes a pivotable portion and a connecting body. The connecting body has two opposite sidewalls respectively having a first convex protrusion and a second convex protrusion. One first convex protrusion is removably engaged to one of the first recesses, and one second convex protrusion is removably engaged to one of the second recesses. Thus, users can adjust the nose pads via adjusting the adjustable member until the nose pads are in position to properly fit the shape of user's nose.

9 Claims, 9 Drawing Sheets

ADJUSTABLE NOSE PAD STRUCTURE

BACKGROUND OF THE INVENTION

1. Field of the Invention

The instant disclosure relates to an eyewear; in particular, to an adjustable nose pad structure for eyewear.

2. Description of Related Art

Conventional nose pads for eyewear are made of two pads respectively arranged on two sides of the frame near the center frontal portion of the eyewear either through two metal wires connected to the frame of the eyewear or an integrally formed body. The nose pads are configured to conform to the shape of a user's nose in order to reduce the pressure induced by the nose pads onto the nose. However, since the two metal wires are prone to deform due to external impact forces, the corresponding positions of the two nose pads tend to shift such that the nose pads cannot conform to the user's nose, and renders discomfort to the user. And the corresponding positions of the nose pads tend to awkwardly tilt with respect to the eyewear, thus, making it difficult to provide a clear and stable vision. If the degree of deformation on the metal wire is small, the metal wire can still be recovered with the proper tools. However, after repeated repairing, the strength of the metal wire significantly reduces.

Since the integrally formed nose pads overcome the awkward tilting due to external impact, the majority of protective eyewear adopts the integrally formed nose pads along with a closed frame for eye protection. As a result, workers can wear protective eyewear to prevent foreign objects from effecting workers' eyes. However, since the protective eyewear can be shared among various workers, the integrally formed nose pads will not conform to the various shapes and sizes of all workers' noses. As a result, the nose pads cause discomfort, or even scratching, swelling, and etc. among workers, which significant affects performance.

To address the above issues, the inventor strives via associated experience and research to present the instant disclosure, which can effectively improve the limitation described above.

SUMMARY OF THE INVENTION

The object of the instant disclosure is to provide an adjustable nose pad structure for eyewear in order to improve upon the non-adjustable nose pad.

In order to achieve the aforementioned objects, according to an embodiment of the instant disclosure, an adjustable nose pad structure includes
Translated after proofread The instant disclosure has the following improvements. Via the adjustable engagement between the protrusions of the adjustable member and the recesses of the main body, the angles of two adjustable members can be adjusted according to the various sizes and shapes of users' noses. As a result, the two adjustable members can completely fit onto a user's nose, which provides more preferable comfort, fit and stability. The left and right adjustable nose pad structures of the instant disclosure are independent structures such that more special shapes and sizes of users' noses can be conformed to.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1:
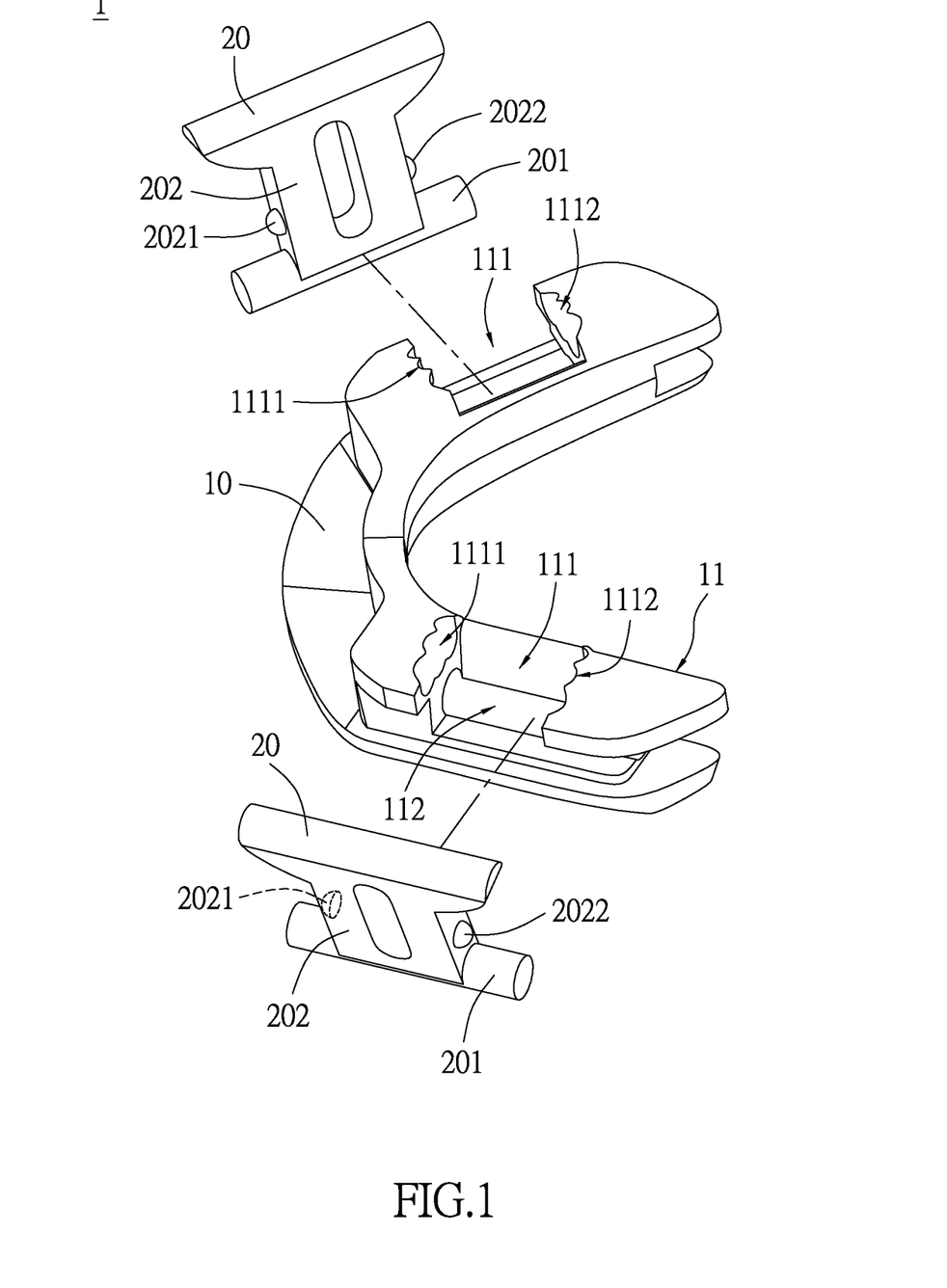
FIG. 1 is an exploded view of an adjustable nose pad structure in accordance with the instant disclosure.
Figure 2:
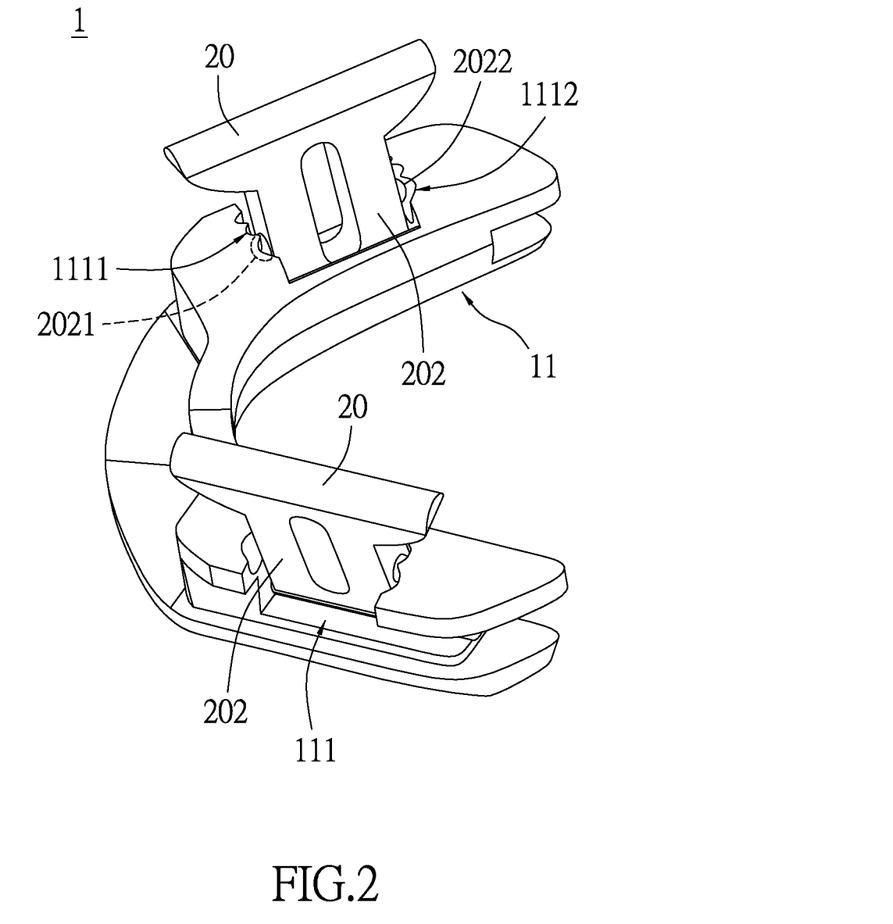
FIG. 2 is a perspective view of the adjustable nose pad structure in accordance with the instant disclosure.

Please refer to FIGS. 1 and 2. FIG. 1 is an exploded view of an adjustable nose pad structure in accordance with the instant disclosure and FIG. 2 is a perspective view of the adjustable nose pad structure in accordance with the instant disclosure. As shown in FIG. 1, the adjustable nose pad structure 1 comprises a main body 10 and two adjustable members 20. The main body 10 is installed on a frame or a lens (both not shown in figures) of the preferred eyewear, and the two adjustable members 20 are installed on the main body 10. The two adjustable members 20 of the instant disclosure are adjustable structures through which nose pads can be adjusted. In other words, the conventional elastic nose pads can be installed (such as sleeved, adhered, clamped, or latched) on the adjustable nose pad structure 1 of the instant disclosure through the adjustable member 20 such that nose pads can be adjusted. In addition, in another embodiment, portions of the adjustable members 20 can be made of elastic and soft materials and directly serve as the nose pads directly making contact with a user's nose.

As shown in FIG. 1, the main body 10 is a U-shaped structure. Each of the two arms of the U-shaped structure includes an adjustable portion 11. Namely, the main body 10 may resemble various shapes according to the preferred design of the eyewear. For example the main body 10 may resemble the shape of a V or other shapes similar to U or V. Although U-shape is used as example in the figures, the instant disclosure is not limited herein. The adjustable portion 11 has portions defining an open slot 111 and a groove 112. The open slot 111 has two oppositely faced sidewalls. One of the sidewall has a plurality of first recesses 1111 and the other sidewall has a plurality of second recesses 1112. The plurality of first recess 1111 in the instant embodiment is a row of arced grooves, and the plurality of second recesses 1112 resembles a similar structure as the plurality of first recesses 1111.

The adjustable member 20 is correspondingly disposed in each adjustable portion 11. Each adjustable member 20 includes a pivotable portion 201 and a connecting body 202.

The pivotable portion 201 and the connecting body 202 are mutually connected. Preferably, a rotational axis of the pivotable portion 201 is normal to a center line of the connecting body 202 along whose lengthwise direction. In other words, the pivotable portion 201 and the connecting body 202 form a T-shaped structure in the instant embodiment, in which the T-shaped structure can be an integrally formed structure. The connecting body 202 has two sidewalls, in which one of the sidewall has a first protrusion 2021 and the other sidewall has a second protrusion 2022. The shape of the first protrusion 2021 corresponds to the shapes of the first recesses 1111, whereas the shape of the second protrusion 2022 corresponds to the shapes of the second recesses 1112. Consequently, the first protrusion 2021 and the second protrusion 2022 can respectively engage to one of the first recesses 1111 and one of the second recesses 1112. Preferably, the first protrusion 2021 and the second protrusion 2022 are hemisphere protrusions.

As shown in FIG. 2, the pivotable portion 201 of each adjustable member 20 is correspondingly disposed in the groove 112 of the adjustable portion 11, and the first protrusion 2021 of the adjustable member 20 is correspondingly engaged in one of the first recesses 1111, whereas the second protrusion 2022 of the adjustable member 20 is correspondingly engaged in one of the second recesses 1112. User can push against the adjustable member 20 such that the first protrusion 2021 is displaced from one of the first recesses 1111 to another one of the first recesses 1111. Similarly, the second protrusion 2022 can be selectively displaced to any one of the second recesses 1112. Thus, through the independent or cooperative adjustment of the first and second protrusions 2021, 2022 respectively with the first and second recesses 1111, 1112, users can adjust nose pads to the most preferred and comfortable configuration according to the various shapes and sizes of users' noses.

[First Embodiment]

Figure 3:
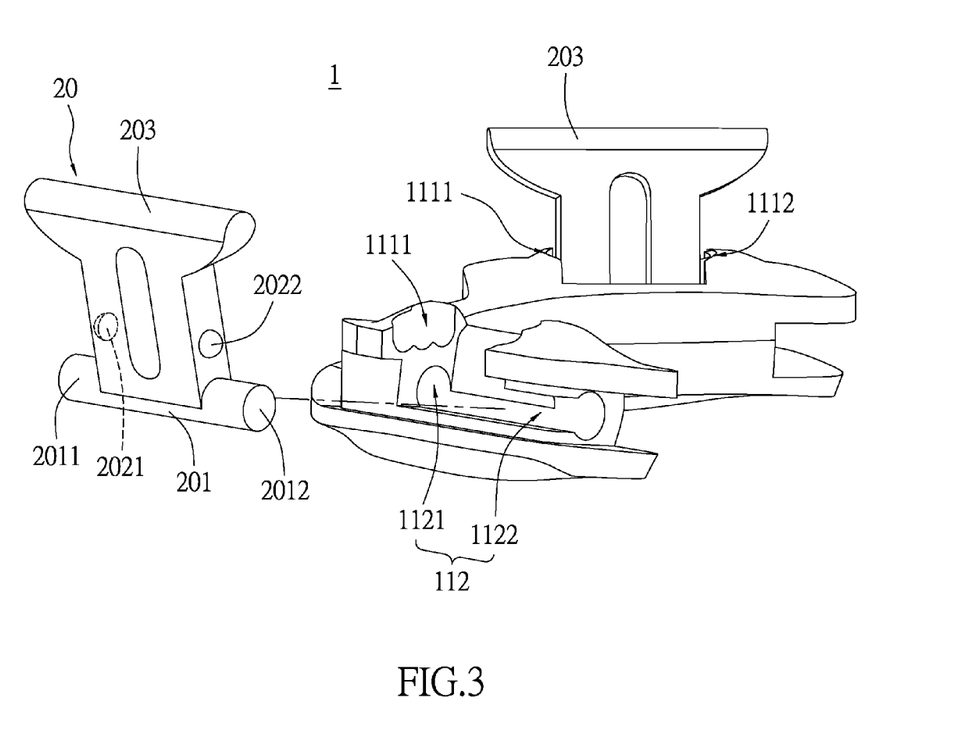
FIG. 3 is a schematic diagram illustrating the first assembly state of the adjustable nose pad structure in accordance with a first embodiment of the instant disclosure.
Figure 4:
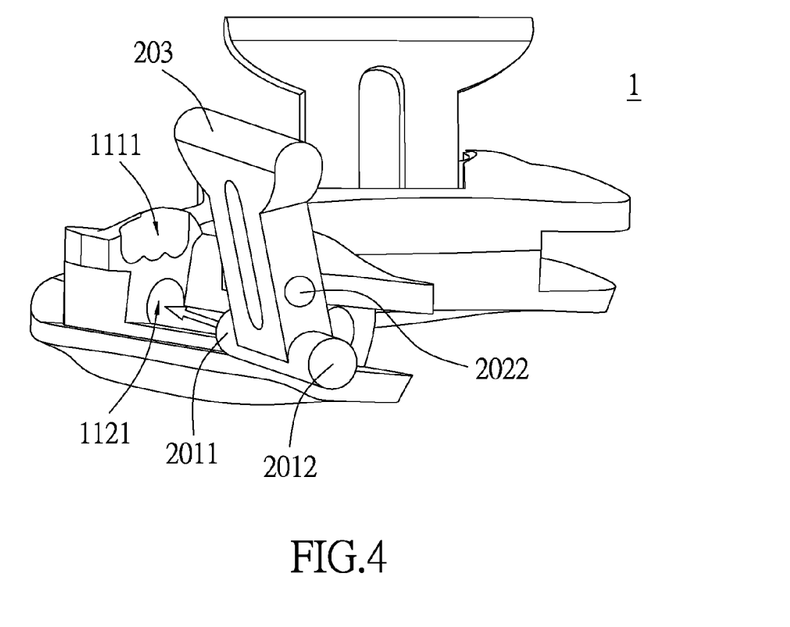
FIG. 4 is a schematic diagram illustrating the second assembly state of the adjustable nose pad structure in accordance with the first embodiment of the instant disclosure.
Figure 5:
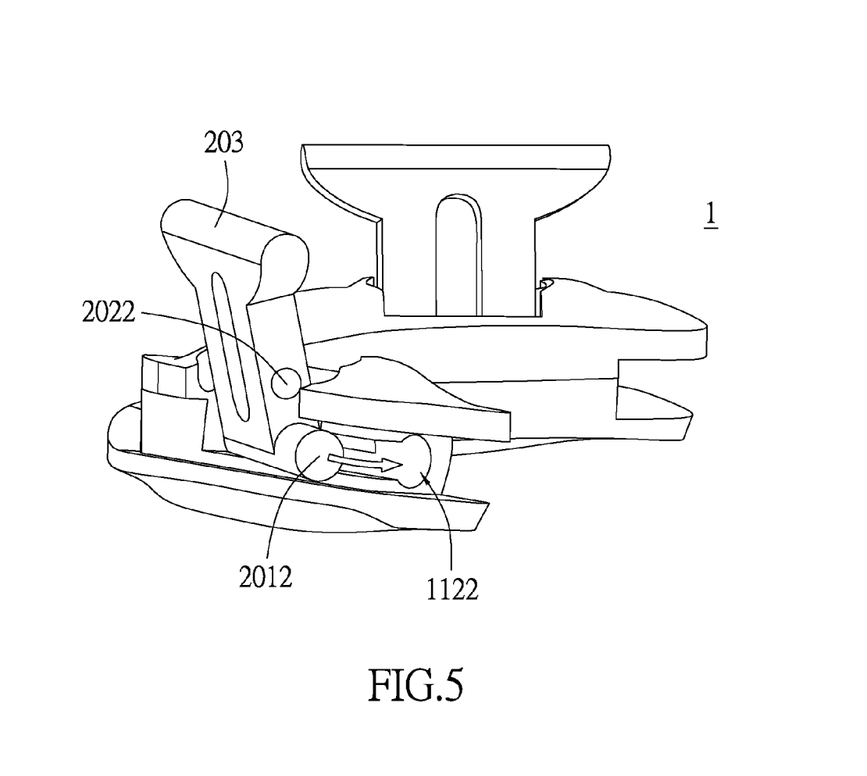
FIG. 5 is a schematic diagram illustrating the third assembly state of the adjustable nose pad structure in accordance with the first embodiment of the instant disclosure.

Please refer to FIGS. 3 to 5. FIG. 3 is a schematic diagram illustrating the first assembly state of the adjustable nose pad structure in accordance with a first embodiment of the instant disclosure. FIG. 4 is a schematic diagram illustrating the second assembly state of the adjustable nose pad structure in accordance with the first embodiment of the instant disclosure. FIG. 5 is a schematic diagram illustrating the third assembly state of the adjustable nose pad structure in accordance with the first embodiment of the instant disclosure. As shown in figures, the groove 112 of the adjustable portion 11 includes a blind hole 1121 and a slit 1122. The groove 112 is arranged beneath the open slot 111 and arranged on one of the sidewalls of the open slot 111. In other words, the groove 112 and the open slot 111 are both arranged on the same sidewall. The blind hole 1121 is arranged on one sidewall of the open slot 111 proximate to the first recesses 1111, and the slit 1122 is arranged on the oppositely faced sidewall of the open slot 111 proximate to the second recesses 1112. Specifically, the blind hole 1121 and the plurality of first recesses 1111 are arranged on the same sidewall of the open slot 111, and the blind hole 1121 is arranged beneath the first recesses 1111. The slit 1122 and the plurality of second recesses 1112 are arranged on the oppositely faced sidewall of the open slot 111, and the slit 1122 is arranged beneath the second recesses 1112.

Each adjustable member 20 further includes a handle 203. The handle 203 is connected to an end of the connecting body 202 opposite to the pivotable portion 201. In other words, two ends of the connecting body 202 are respectively connected to the pivotable portion 201 and the handle 203. The handle 203 can be an elastic body, which can be directly applied as a nose pad. The handle 203 can also be made of hard plastic materials and be sleeved, adhered, clamped or latched onto by an elastic nose pad. Preferably, the handle 203 is parallel with respect to the pivotable portion 201. Preferably, the pivotable portion 201, the connecting body 202, and the handle 203 are integrally formed. In other words, the adjustable member 20 may resemble an I-shaped structure.

As shown in FIG. 3, the pivotable portion 201 has a first pivoting end 2011 and a second pivoting end 2012. During assembly, user can first engage the first pivoting end 2011 into the blind hole 1121. Subsequently, the second pivoting end 2012 is pushed through the slit 1122 as shown in FIG. 4 such that the adjustable member 20 is engaged in the groove 112. Then, the connecting body 202 of the adjustable member 20 can be correspondingly installed in the open slot 111. Moreover, the first protrusion 2021 and the second protrusion 2022 of the adjustable member 20 respectively engage to one of the first recesses 1111 and one of the second recesses 1112 of the open slot 111. Thusly, user can adjust the position of the first and second protrusions 2021, 2022 with respective to the open slot 111 through the handle 203 of the adjustable member 20. As such, the angle and position of the adjustable member 20 can be adjusted such that the angle and position of the nose pads can be adjusted.

The following description provides various examples of the possible adjustments of the adjustable member 20. Notably, the following embodiments only use three first recesses 1111 and three second recesses 1112 as an example, but the quantity is not limited herein.

[Second Embodiment]

Figure 6:
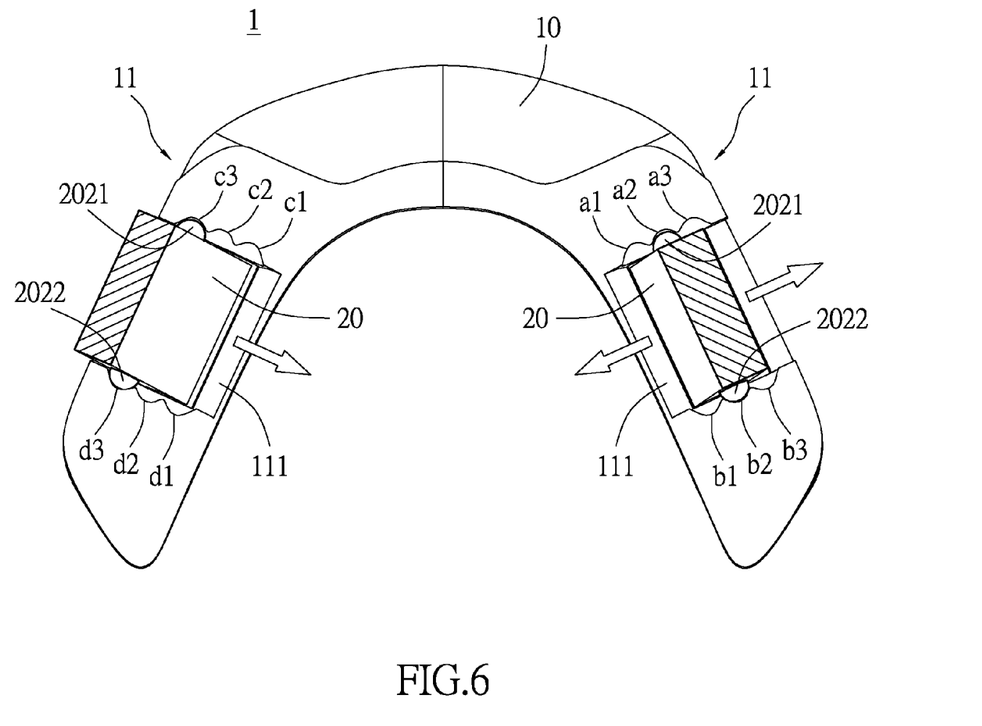
FIG. 6 is a schematic diagram of the adjustable nose pad structure in accordance with a second embodiment of the instant disclosure.

Please refer to FIG. 6 as a schematic diagram of the adjustable nose pad structure in accordance with a second embodiment of the instant disclosure. As shown in the figure, the main body 10 is a U-shaped structure. Each of the two arms of the U-shaped structure includes an adjustable portion 11. The adjustable member 20 is correspondingly disposed in the adjustable portion 11. Please refer to the configurations and assemblies between the adjustable portion 11 and the adjustable member 20 as previously mentioned. The specific operations of each adjustment member 20 with respect to the open slot 111 of the adjustable portion 11 are disclosed as the following. As shown in FIG. 6, the main body 10 is viewed from above. Thus, the terms "above", "beneath", "left", and "right" are only relative to the positioning of the components in the perspective as described in the embodiments. Arranged above the open slot 111 on the right lateral side of the body 10 are three first recesses 1111, in which the three first recesses are denoted as a1, a2, and a3 from hereon. Also, arranged beneath the open slot 111 on the right lateral side of the body 10 are three second recesses 1112 corresponding to the three first recesses 1111, in which the three second recesses are denoted as b1, b2, and b3 from hereon. Similarly, arranged above the open slot 111 on the left lateral side of the body 10 are three first recesses 1111, in which the three first recesses are denoted as c1, c2, and c3 from hereon. Also, arranged beneath the open slot 111 on the left lateral side of the body 10 are three second recesses 1112 corresponding to the three first recesses 1111, in which the three second recesses are denoted as d1, d2, and d3 from hereon. Notably, the adjustable member 20 preferably resembles an I-shaped structure. In order to clarify the relative positions of the adjustable member 20 and the open slot 111, a top surface of the I-shaped adjustable member 20 are hatch-marked as shown.

As shown in the adjustable portion 11 on the right lateral side, the first protrusion 2021 and the second protrusion 2022 of the adjustable member 20 respectively engage the recess a2 of the first recesses 1111 and the recess b2 of the second recesses 1112. At such time, user can simultaneously push the first protrusion 2021 and the second protrusion 2022 of the adjustable member 20 towards the left or right direction. In other words, the first protrusion 2021 can be displaced from the recess a2 of the first recesses 1111 to either the recess a1 or a3, while the second protrusion 2022 can be displaced from the recess b2 of the second recesses 1112 to either the recess b1 or b3. Similarly, in the adjustable portion 11 on the left lateral side, the first protrusion 2021 and the second protrusion 2022 of the adjustable member 20 respectively engage the recess c1 of the first recesses 1111 and the recess d1 of the second recesses 1112. At such time, user can adjust the adjustable member 20 such that the first protrusion 2021 and the second protrusion 2022 simultaneously and respectively displace to the recess c2 (or the recess c3) of the first recesses 1111 and the recess d2 (or the recess d3) of the second recesses 1112. Via the aforementioned adjustments, user can make leveled adjustments to the nose pads by adjusting the adjustable member 20.

For example, if the angles of the nose pads fit the overall shape of the user's nose yet the distance between the nose pads is not suitable, user can simultaneously adjust the first protrusion 2021 and the second protrusion 2022 of the adjustable member 20 to increase or reduce the distance between the nose pads for a more preferred fit.

[Third Embodiment]

Figure 7:
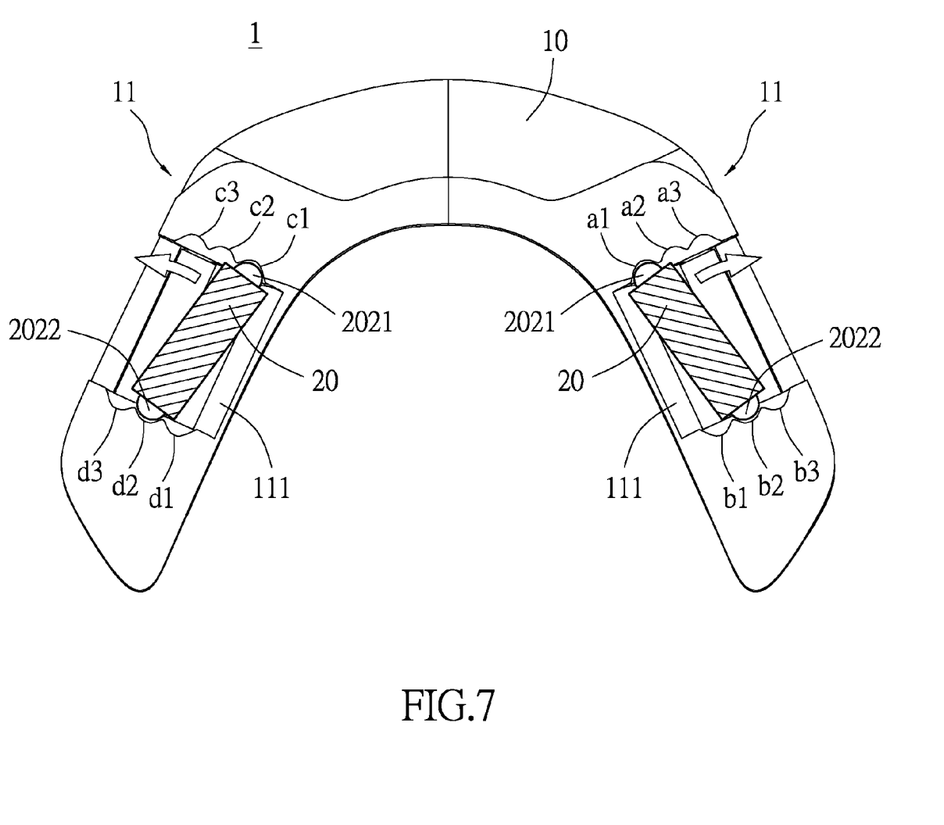
FIG. 7 is a schematic diagram of the adjustable nose pad structure in accordance with a third embodiment of the instant disclosure.

Please refer to FIG. 7 as a schematic diagram of the adjustable nose pad structure in accordance with a third embodiment of the instant disclosure. Taken into account of the previous embodiment, each adjustable member 20 of the instant embodiment pivots. Please refer to the adjustable portion 11 on the right lateral side as shown in FIG. 7. The first protrusion 2021 and the second protrusion 2022 of the adjustable member 20 respectively engage the recess al of the first recesses 1111 and the recess b2 of the second recesses 1112. At such time, user can pivot the first protrusion 2021 of the adjustable member 20 in a clockwise direction to the recess a2 (or the recess a3) of the first recesses 1111, such that substantially a half portion of the adjustable member 20 is pivoted. Please refer to the adjustable portion 11 on the left lateral side. Similar, user can pivot the first protrusion 2021, which is already engaged to the recess c3 of the first recesses 1111, in a counter clockwise direction to the recess c2 (or the recess c1) of the first recesses 1111. Understandably, the two second protrusions 2022 of each connecting body 20 can be respectively engaged to the recess b1 (or b3) and the recess dl (or d3) of the second recesses 1112, such that the first protrusions 2021 correspondingly pivot in a clockwise or counter clockwise direction. As a result, user can adjust the adjustable member 20 by adjusting the angle of the nose pads. For example, if an upper half portion of the nose pad is not in proper contact with the nose, user can directly pivot the upper half portion of the adjustable member 20 such that the nose pad can be in proper fit with the user's nose.

[Fourth Embodiment]

Figure 8:
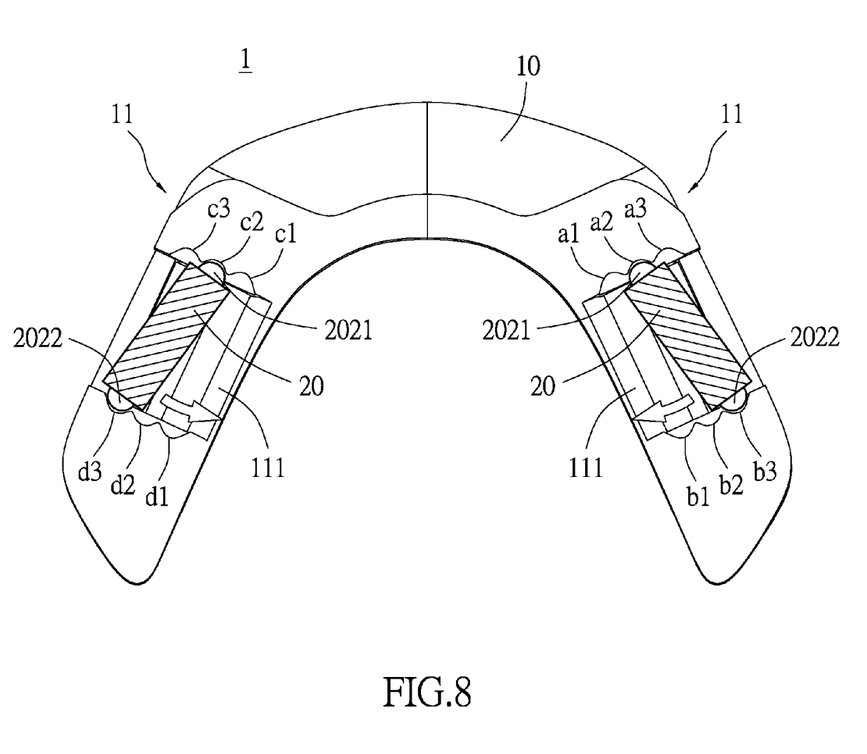
FIG. 8 is a schematic diagram of the adjustable nose pad structure in accordance with a fourth embodiment of the instant disclosure.

FIG. 8 is a schematic diagram of the adjustable nose pad structure in accordance with a fourth embodiment of the instant disclosure. Taken into account of the previous embodiment (Third embodiment), if a lower half portion of the nose pad is not in proper contact with the nose, user can directly and pivotally adjust the lower half portion of the adjustable member 20 in a clockwise or counter clockwise direction such that the nose pad can be in proper fit with the user's nose. Since the operation mode of the adjustable member 20 is similar to the previous embodiment, it will not be discussed further. Please refer to FIG. 8 and the aforementioned description if necessary.

[Fifth Embodiment]

Figure 9:
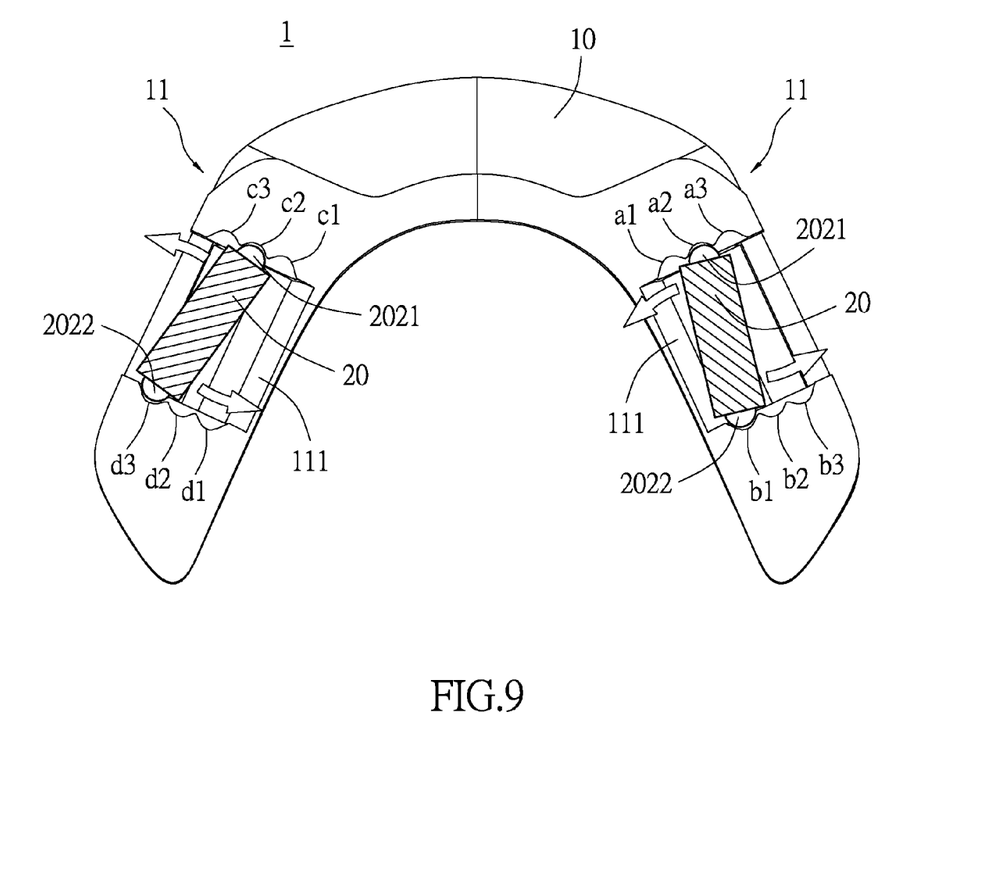
FIG. 9 is a schematic diagram of the adjustable nose pad structure in accordance with a fifth embodiment of the instant disclosure.

FIG. 9 is a schematic diagram of the adjustable nose pad structure in accordance with a fifth embodiment of the instant disclosure. Taken into account of the description of the second to the fourth embodiments, user can repeatedly and separately pivot the upper half portion and the lower half portion of the adjustable member 20 or adjust the entire adjustable member 20 in the instant embodiment. As a result, nose pads can properly fit onto user's nose. Since the operation mode of the adjustable member 20 is similar to the previous embodiment, it will not be discussed further. Notably, the two adjustable members 20 are independent components which can be adjusted individually according to preference. As a result, the adjustable members 20 can conform to noses of various sizes and shapes. For example, the adjustable members 20 of the instant disclosure can conform to a crooked nose recovered after a car accident.

[Sixth Embodiment]

Figure 10:
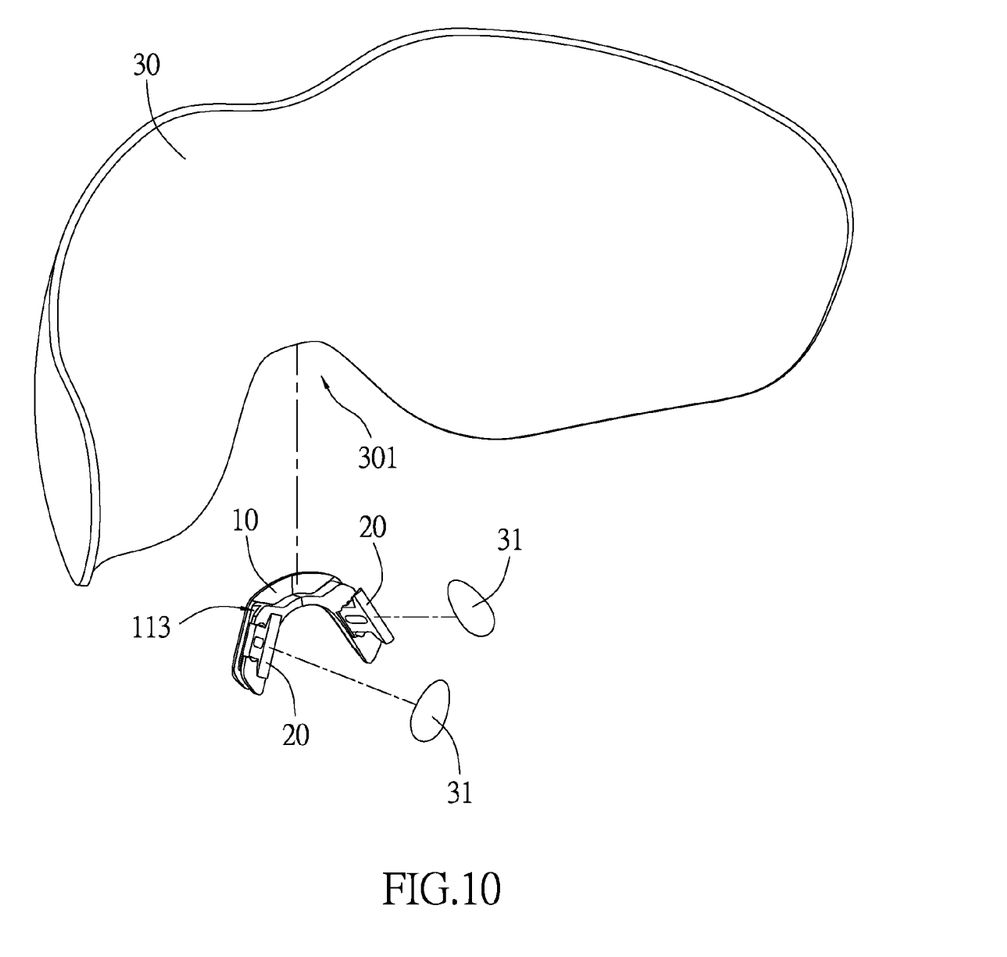
FIG. 10 is a schematic diagram of the adjustable nose pad structure in accordance with a sixth embodiment of the instant disclosure.

FIG. 10 is a schematic diagram of the adjustable nose pad structure in accordance with a sixth embodiment of the instant disclosure. As shown in the figure, the adjustable nose pad structure 1 of the instant disclosure can be installed on a piece of eyewear 30. The eyewear 30 has a central portion defining a nose pad coupling portion 301. As aforementioned, each of the two lateral sides of the adjustable nose pad structure 1 (main body 10) has the adjustable portion 11. Each adjustable portion 11 has a coupling portion 113 arranged on a side portion of the adjustable portion 11. The adjustable nose pad structure 1 is coupled to the eyewear 30 through the engagement between the coupling portion 113 of the structure 1 and the nose pad coupling portion 301 of the eyewear 30. The structure 1 can be coupled to a lens or a frame of the eyewear 30. Each handle 203 of the adjustable member 20 can be connected to an elastic nose pad 31.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. An adjustable nose pad structure, comprising:
  a U-shaped main body, two arms of the U-shaped main body each having an adjustable portion, each adjustable portion having portions defining:
    an open slot having two opposite sidewalls, and having a plurality of first recesses arranged on one sidewall and a plurality of second recesses arranged on the other sidewall; and
    a groove arranged beneath the open slot on one of the sidewalls of the open slot, and in air communication with the open slot; and
  two adjustable members respectively disposed in each of the adjustable portions, each of the adjustable members including:
    a pivotable portion; and
    a connecting body connected to the pivotable portion, the connecting body having two opposite sidewalls, and the two sidewalls respectively having a first convex protrusion and a second convex protrusion;
  wherein each of the adjustable members is removably engaged to each of the adjustable portions, the pivotable portion of each adjustable member is pivotally engaged to the groove of each adjustable portion, the first convex protrusion of each adjustable member is removably engaged to one of the first recesses of the adjustable portion, and the second convex protrusion of each adjustable member is removably engaged to one of the second recesses of the adjustable portion.

2. The adjustable nose pad structure as recited in claim 1, wherein each adjustable member further includes a handle and two ends of the connecting body is respectively connected to the handle and the pivotable portion.

3. The adjustable nose pad structure as recited in claim 2, wherein the handle of the adjustable member is pushed against such that the first convex protrusion is moved from one of the first recesses to another one of the first recesses.

4. The adjustable nose pad structure as recited in claim 2, wherein the handle of the adjustable member is pushed against such that the second convex protrusion is moved from one of the second recesses to another one of the second recesses.

5. The adjustable nose pad structure as recited in claim 2, wherein the handle is an elastic body.

6. The adjustable nose pad structure as recited in claim 1, wherein each adjustable member further has an elastic nose pad sleeved thereon.

7. The adjustable nose pad structure as recited in claim 1, wherein the groove has a blind hole and a slit, the blind hole is arranged on the one of the sidewalls of the open slot proximate to the first recesses, and the slit is formed on the other sidewall of the open slot proximate to the second recesses.

8. The adjustable nose pad structure as recited in claim 1, wherein each of the two lateral sides of the main body has a coupling portion for correspondingly engaging to a nose pad coupling portion of an eyewear.

9. The adjustable nose pad structure as recited in claim 8, wherein the nose pad coupling portion is arranged proximate to a central portion of a lens or a frame.

* * * * *